(12) United States Patent
Modarresi

(10) Patent No.: US 9,298,540 B2
(45) Date of Patent: Mar. 29, 2016

(54) DETECTION AND RESTORATION OF ERRONEOUS DATA

(71) Applicant: ADOBE SYSTEMS INCORPORATED, San Jose, CA (US)

(72) Inventor: Kourosh Modarresi, Los Altos, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 165 days.

(21) Appl. No.: 14/190,877

(22) Filed: Feb. 26, 2014

(65) Prior Publication Data

US 2015/0242267 A1 Aug. 27, 2015

(51) Int. Cl.
*H03M 13/00* (2006.01)
*G06F 11/07* (2006.01)

(52) U.S. Cl.
CPC ........ *G06F 11/0793* (2013.01); *G06F 11/0727* (2013.01)

(58) Field of Classification Search
CPC .................. G06F 11/0793; G06F 11/0727
See application file for complete search history.

(56) References Cited

U.S. PATENT DOCUMENTS

2011/0314269 A1* 12/2011 Stavrou ............... G06F 21/6209
713/150

* cited by examiner

*Primary Examiner* — Sam Rizk
(74) *Attorney, Agent, or Firm* — Shook Hardy & Bacon L.L.P.

(57) ABSTRACT

Embodiments of the present invention provide systems, methods, and computer storage media for detecting and restoring erroneous data. In cases that a data entry within a data matrix is determined to be erroneous, the data entry can be restored using a replacement value calculated in accordance with other data from the data matrix. In particular, the number of dimensions used to calculate the replacement value can be reduced from the complete set of dimensions to avoid unnecessary noise data that may impact corrected data values.

20 Claims, 11 Drawing Sheets

| VARIABLE 1 | VARIABLE 2 | VARIABLE 3 | VARIABLE 4 | VARIABLE 5 | VARIABLE 6 | VARIABLE 7 | VARIABLE 8 |
|---|---|---|---|---|---|---|---|
| 1 | 9 | 204 | 5888 | 1 | 1 | 204 | 9 |
| 1 | 48 | 74 | 4994 | 1 | 1 | 74 | 48 |
| 1 | 32 | 489 | 3918 | 1 | 1 | 489 | 32 |
| 1 | 28 | 75 | 4451 | 1 | 1 | 75 | 28 |
| 1 | 16 | 87 | 10090 | 1 | 1 | 87 | 16 |
| 2 | 18.5 | 140 | 3778 | 1 | 2 | 140 | 37 |
| 1 | 5 | 1491 | 6537 | 1 | 1 | 1491 | 5 |
| 3 | 5.666667 | 103 | 10067 | 2 | 3 | 103 | 17 |
| 3 | 10.66667 | 141 | 8143 | 2 | 3 | 283 | 32 |
| 4 | 1.25 | 228 | 8244 | 2 | 2 | 228 | 5 |

FIG. 2A

| VARIABLE 1 | VARIABLE 2 | VARIABLE 3 | VARIABLE 4 | VARIABLE 5 | VARIABLE 6 | VARIABLE 7 | VARIABLE 8 |
|---|---|---|---|---|---|---|---|
| 1 | 9 | 204 | 5888 | 1 | 1 | 204 | 9 |
| 1 | N/A | 74 | 4994 | 1 | 1 | 74 | 48 |
| 1 | 32 | 489 | 3918 | 1 | 1 | 489 | 32 |
| 1 | 28 | 75 | 4451 | 1 | 1 | 75 | 28 |
| 1 | 16 | 87 | 10090 | 1 | 1 | 87 | 16 |
| 2 | 18.5 | 140 | 3778 | 1 | 2 | 140 | 37 |
| 1 | 5 | N/A | 6537 | 1 | 1 | N/A | 5 |
| 3 | 5.666667 | 103 | 10067 | 2 | 3 | 103 | 17 |
| 3 | 10.66667 | 141 | 8143 | 2 | 3 | 283 | 32 |
| N/A | N/A | 228 | 8244 | 2 | 2 | 228 | 5 |

FIG. 2B

| VARIABLE 1 | VARIABLE 2 | VARIABLE 3 | VARIABLE 4 | VARIABLE 5 | VARIABLE 6 | VARIABLE 7 | VARIABLE 8 |
|---|---|---|---|---|---|---|---|
| 1 | 9 | 204 | 5888 | 1 | 1 | 204 | 9 |
| 1 | 7.309388 | 74 | 4994 | 1 | 1 | 74 | 48 |
| 1 | 32 | 489 | 3918 | 1 | 1 | 489 | 32 |
| 1 | 28 | 75 | 4451 | 1 | 1 | 75 | 28 |
| 1 | 16 | 87 | 10090 | 1 | 1 | 87 | 16 |
| 2 | 18.5 | 140 | 3778 | 1 | 2 | 140 | 37 |
| 1 | 5 | 172.1303 | 6537 | 1 | 1 | 174.5788 | 5 |
| 3 | 5.666667 | 103 | 10067 | 2 | 3 | 103 | 17 |
| 3 | 10.66667 | 141 | 8143 | 2 | 3 | 283 | 32 |
| 1.704077 | 18.71503 | 228 | 8244 | 2 | 2 | 228 | 5 |

FIG. 2C $A_{ij}$ = frequency of j-th term in the i-th document $A_{ij}$ = conversion ($) of j-th ad by the i-th user

DETECTION AND RESTORATION OF ERRONEOUS DATA

BACKGROUND

Data analysis is frequently used to discover useable information, provide suggestions or recommendations, and support decision making in a number of environments. For example, many businesses rely on data analysis to improve performance and quality. In any environment, correct data is critical to perform an accurate analysis of the data. In some cases, erroneous data can lead to false conclusions or misdirected guidance potentially resulting in costly consequences. In the process of data observations and data collections, however, incorrect data entries frequently occur during the observations and collections such that data is recorded in error. Some of the causes leading to erroneous data entries include, among others, erroneous data collection methods; constraints (e.g., time or physical) in collecting data; inability to repeat observations; human error, for instance, causing the destruction of data, incorrect measurements, and/or incorrect recordings; machine error such as distortion of data on memory; process error resulting from the storage, transformation, and/or handling of data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to detecting and correcting erroneous data. In this regard, data within a data matrix detected as being erroneous can be replaced with data implied as correct, in accordance with embodiments described herein. Initially, a data matrix is referenced for detection of erroneous data. The data within the data matrix is analyzed to detect any erroneous data. In some implementations, data is determined to be erroneous when it does not fit a determined distribution within an error detection threshold. Thereafter, a data restoration method can be employed to determine a value implied to be correct. In some implementations, the correct values for replacing the erroneous values can be determined by using data associated with a reduced number of dimensions to determine replacement values. In determining the reduced number of dimensions to use for determining replacement values, a variation threshold might be used to capture the dimensions providing a particular amount of data variation. Data associated with the reduced number of dimensions can then be used to determine replacement values.

BRIEF DESCRIPTION OF THE DRAWINGS

The present invention is described in detail below with reference to the attached drawing figures, wherein:

FIG. 2A is an exemplary data matrix having erroneous data in accordance with an embodiment of the present invention;

FIG. 2B is an exemplary data matrix with the erroneous data discarded according to embodiments of the present invention;

FIG. 2C is an exemplary data matrix having corrected data values replacing the erroneous data values in accordance with an embodiment of the present invention;

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
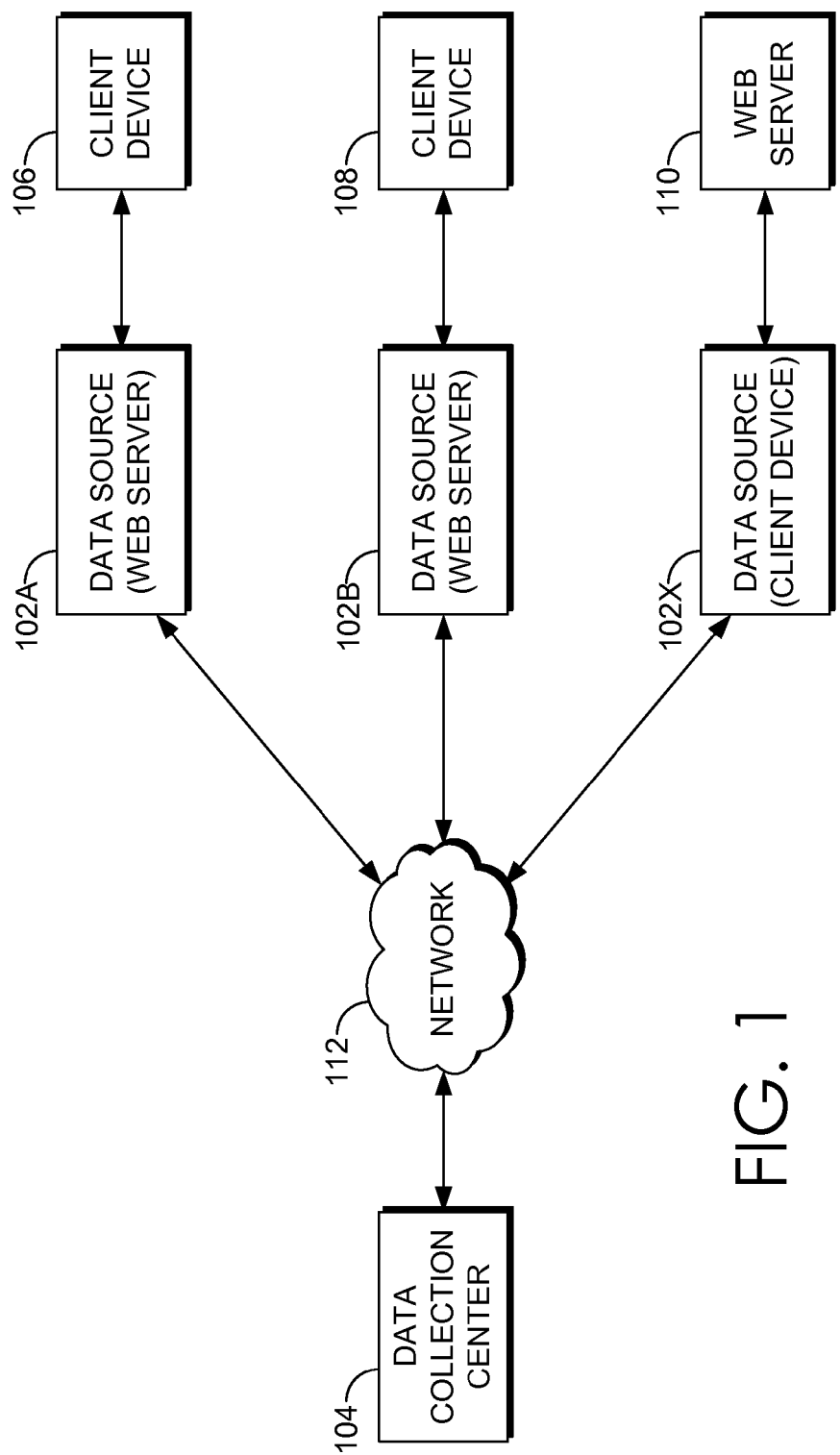
FIG. 1 is a block diagram of an exemplary data collection environment suitable for use in implementing embodiments of the present invention.

Too frequently, data collected at a data collection center, such as the data collection center 104 of FIG. 1, is erroneous. Such erroneous data might be captured for any number of reasons including human errors, process errors, machine errors, or the like. Correct data, however, is invaluable to perform an accurate analysis of the data. With the large quantity of data captured in many environments having an abundant amount of dimensions, detection and/or correction of erroneous data can be difficult. Embodiments of the present invention are directed to detecting erroneous data and, thereafter, restoring or correcting the data such that appropriate or correct data can be analyzed. Such embodiments can provide an efficient mechanism for recognizing and correcting erroneous data even within extremely large data sets, for example, by scaling down the data for use in determining a replacement value for an erroneous data entry. In this regard, techniques described herein can be scaled for use with a small data set and/or a large data set.

Upon detecting data entries as erroneous, a data restoration method can be employed to determine a value implied to be correct (i.e., a correct value). In some implementations, the correct values for replacing the erroneous values can be determined by using data associated with a reduced number of dimensions to determine replacement values. As such, a smaller, more relevant, portion of data can be analyzed to determine a replacement value for data entries detected as erroneous. A dimension refers to a feature, variable, covariate, predictor, attribute, factor, regressor, input, field, or any other type of data, for example, represented by a column in a data matrix. In determining the reduced number of dimensions to use for determining replacement values, a variation threshold might be used to capture the dimensions providing a particular amount of data variation. Data associated with the reduced number of dimensions can then be used to determine replacement values. Calculation of replacement values can continue until a new replacement value converges with a previous replacement value. In such a case, the replacement value can be designated as a correct value and used to replace or correct the erroneous data.

Accurate data analysis and, therefore, reliable data is invaluable in many environments. For example, in an exemplary environment of web analytics, accurate data is desirable for any number of analyses performed on data associated with website traffic. Web analytics can include, for example, capturing data on website usage. In this regard, a variety of website traffic data can be measured including the type of browser being used, links selected on a particular web page, conversions, etc. To assist in the collection and analysis of online analytics data, some web analysis tools, such as the ADOBE SITECATALYST tool, have been developed that provide mechanisms to collect information regarding website usage and to manage analysis of the collected data. With such tools, analyzing accurate or correct data results in more useful information being provided to users of the tools. Further, due to the unwieldy amounts of data collected, efficient detection of erroneous data and correction thereof is desirable.

By way of example only, and with reference to FIG. 1, a data collection center associated with a web analysis tool (not shown) is used to collect a large amount of web data available via the World Wide Web, which may include any number of web services or sites. The amount of data available is extremely large, and it may be impractical or burdensome for the website provider to collect and/or analyze such data. As such, a data collection center associated with a web analysis tool can collect web site visitors' online analytics data such as page views and visits that are relevant to a web site(s).

Such a large amount of web data results, in part, from the numerous data sources providing web data. With continued reference to FIG. 1, in one embodiment, each of the data sources 102A, 102B, and 102X provide a data collection center 104 with data describing web traffic. Each of data sources 102A, 102B, and 102X is a data source, such as a web server or a client device, capable of providing data associated with website usage, for example, via a network 112. For instance, data source 102A might be a web server associated with a website, data source 102B might be a web server associated with the website, and data source 102X might be a client device being used to navigate the website via a browser.

As illustrated in FIG. 1, data source 102A and data source 102B can obtain web data based on interactions with the respective client devices 106 and 108. In this regard, the browsers of the client devices can request web pages from the corresponding web servers and, in response, the web servers return the appropriate HTML page to the requesting client devices. Web data detected from navigations of the corresponding web pages at client devices 106 and 108 can be obtained at the web servers 102A and 102B and provided to the data collection center 104 via the network 112. By comparison, data source 102X can be a client device having a browser that requests a web page from a web server 110. The web server 110 can return to the client device 102X the appropriate HTML page with code (e.g., JavaScript code) that triggers communication of the web data to the data collection center 104 via the network 112.

Although FIG. 1 illustrates data sources as including both web servers and client devices, in some embodiments, such data sources might be solely web servers or solely client devices. Further, as can be appreciated, the web data provided to the data collection center 104 from the data sources can be associated with any number of web sites. For instance, in some cases, each of the data sources might provide data associated with a single web site (e.g., various clients navigating a particular web site). In other cases, the data sources might provide web data associated with multiple web sites (e.g., web servers associated with various web sites).

While FIG. 1 is generally described herein in reference to a web analytics environment, data collection may occur in any number of environments including any other web or non-web related environment. Irrespective of the environment, the data collection center 104 can collect data from any number of data sources and in any manner.

As will be discussed in further detail below, a data analysis tool can be used to detect and/or restore erroneous data. The data analysis tool can perform such functionality in association with any amount of numerical data. Further, the detection and/or restoration functionality described herein can be applied to data associated with any type of subject matter, such as, for example, shopping data, text document data, advertisement targeting data, or the like.

Various terms are used throughout this description. Although more details regarding various terms are provided throughout this description, general definitions of some terms are included below to provider a clearer understanding of the ideas disclosed herein:

A "matrix" or "data matrix" generally refers to a two-dimensional set of data associated with various variables (or dimensions). In a data matrix, rows and columns may be used to delineate or organize the data. FIGS. 2A-2C and 5-7 illustrate various examples of data matrices.

A "data entry" refers to a value of data, for example, within a data matrix. Data entries 206A, 208A, 210A, 212A, and 214A of FIG. 2 are examples of data entries within a data matrix.

As used herein, a "dimension" refers to a feature, variable, covariate, predictor, attribute, factor, regressor, input, field, or any other type of data, for example, represented by a column in a data matrix.

"Data variation," as used herein, refers to a variation or difference of or among data. Variation can be measured in association with any number of values, such as two or more data entries.

As used herein, a "variation threshold" refers to any value that indicates an extent of variation. For instance, a variation threshold might be a probability (e.g., percent) that, if exceeded, indicates that a certain amount of variation exists in data associated with the corresponding number of dimensions.

Generally, "singular value decomposition" is a factorization of a data matrix. That is, singular value decomposition decomposes a matrix into a product of matrices including a diagonal matrix. As described in more detail below, singular value decomposition is used herein to determine a value that could be implied as correct for a data entry indicated as erroneous based on other meaningful data in the matrix.

"Erroneous data" refers to data that is incorrect or contains error.

By way of example generally, and with reference to FIGS. 2A-2C, FIGS. 2A-2C illustrate a data matrix in which data is detected as erroneous and, thereafter, is replaced with data implied as correct, in accordance with embodiments described herein. Initially, as illustrated in FIG. 2A, data matrix 200 is initially referenced for detection of erroneous data. The data matrix 200 includes data 202 associated with various variables (or dimensions) 204. The data within the data matrix 200 is analyzed to detect any erroneous data. In some implementations, data is determined to be erroneous when it does not fit a determined distribution within an error detection threshold. Assume that data entries 206A, 208A, 210A, 212A, and 214A of FIG. 2 are determined to be erroneous. In such a case, the data entries detected as erroneous can be discarded or otherwise indicated as erroneous, as illustrated by data entries 206B, 208B, 210B, 212B, and 214B of FIG. 2B.

Because such data entries are designated as erroneous, a data restoration method can be employed to determine a value implied to be correct (i.e., a correct value). In some implementations, the correct values for replacing the erroneous values can be determined by using data associated with a reduced number of dimensions to determine replacement values. In determining the reduced number of dimensions to use for determining replacement values, a variation threshold might be used to capture the dimensions providing a particular amount of data variation. Data associated with the reduced number of dimensions can then be used to determine replacement values. Calculation of replacement values can continue until a new replacement value converges with a previous replacement value. In such a case, the replacement value can be designated as a correct value and used to replace or correct the erroneous data. With reference to FIG. 2C, FIG. 2C illustrates correct data entries 206C, 208C, 210C, 212C, and 214C used to replace the corresponding data deemed erroneous.

Accordingly, in one aspect, an embodiment of the present invention is directed to one or more computer storage media storing computer-useable instructions that, when used by one or more computing devices, cause the one or more computing devices to perform operations. The operations include referencing a matrix having a data entry detected as erroneous. The operations also include selecting a number of dimensions to which to reduce, wherein the number of dimensions is selected based on data variation, associated with the number of dimensions, that exceeds a variation threshold. The operations also include reducing data in accordance with the selected number of dimensions. The operations further include using a set of remaining data corresponding with the reduced number of dimensions to generate a replacement value for the data entry detected as erroneous.

In another embodiment of the invention, an aspect is directed to a method. The method includes computing a singular value decomposition of a data matrix having a data entry determined to be erroneous, the singular value decomposition including a diagonal matrix associated with a first number of dimensions. The method also includes determining that the first number of dimensions is to be reduced to a second number of dimensions when a sum of singular values within the diagonal matrix that correspond to the second number of dimensions divided by a sum of singular values within the diagonal matrix that correspond to the first number of dimensions exceeds a variation threshold. The method further includes reducing matrices of the singular value decomposition in accordance with the second number of dimensions. The method still further includes using the reduced matrices of the singular value decomposition to calculate a replacement value for the erroneous data entry.

A further embodiment is directed to a system that includes one or more processors; and one or more computer storage media storing computer-useable instructions that, when used by the one or more processors, cause the one or more processors to: detect an erroneous data entry within a matrix; replace the erroneous data entry within the matrix with an initial replacement value; perform singular value decomposition on the matrix with the initial replacement value, the singular value decomposition including a diagonal matrix having singular values that provide an indication of variance of the corresponding dimension; maintain one or more largest singular values within the diagonal matrix when the sum of the one or more largest singular values divided by a sum of all the singular values within the diagonal matrix exceeds a variance threshold value; utilize the one or more largest singular values to determine a replacement value for the erroneous data entry; and compare the replacement value with the initial replacement value to determine that the replacement value is a correct implied value for the erroneous data entry.

Figure 3:
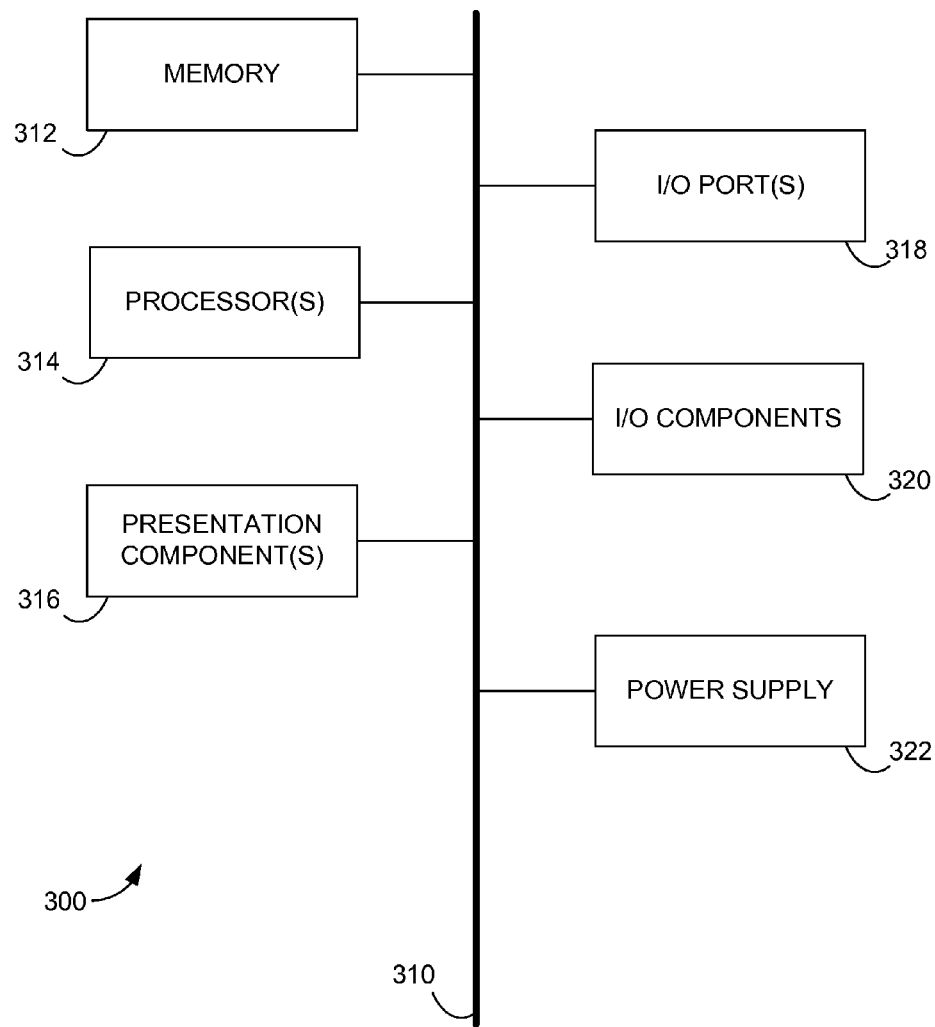
FIG. 3 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 3 in particular, an exemplary operating environment for implementing embodiments of the present invention is shown and designated generally as computing device 300. Computing device 300 is but one example of a suitable computing environment and is not intended to suggest any limitation as to the scope of use or functionality of the invention. Neither should the computing device 300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 3, computing device 300 includes a bus 310 that directly or indirectly couples the following devices: memory 312, one or more processors 314, one or more presentation components 316, input/output (I/O) ports 318, input/output components 320, and an illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 3 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 3 and reference to "computing device."

Computing device 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer-storage media in the form of volatile and/or nonvolatile memory. The memory may be removable, non-removable, or a combination thereof. Exemplary hardware devices include solid-state memory, hard drives, optical-disc drives, etc. Computing device 300 includes one or more processors that read data from various entities such as memory 312 or I/O components 320. Presentation component(s) 316 present data indications to a user or other device. Exemplary presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc. The I/O components 320 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 300. The computing device 300 may be equipped with depth cameras, such as, stereoscopic camera systems, infrared camera systems, RGB camera systems, and combinations of these for gesture detection and recognition. Additionally, the computing device 300 may be equipped with accelerometers or gyroscopes that enable detection of motion. The output of the accelerometers or gyroscopes may be provided to the display of the computing device 300 to render immersive augmented reality or virtual reality.

Figure 4:
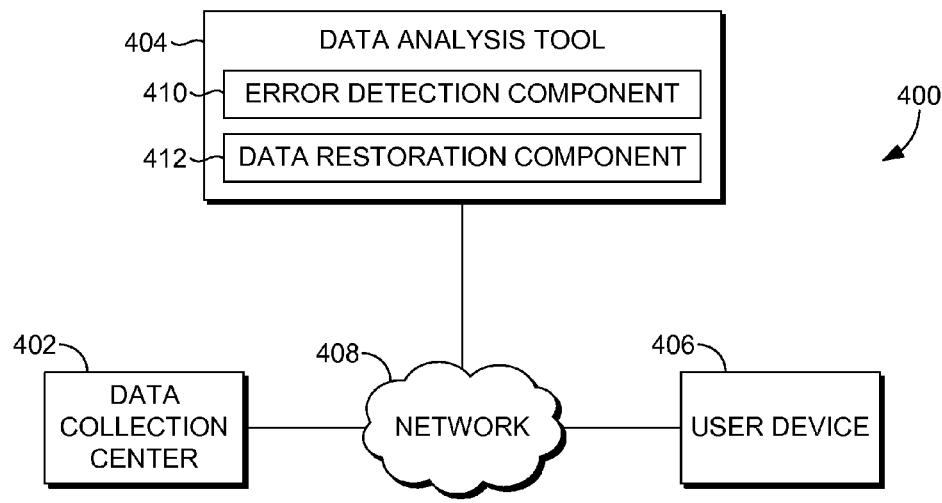
FIG. 4 is a block diagram of an exemplary system architecture in which embodiments of the invention may be employed.

Turning now to FIG. 4 a block diagram is provided illustrating an exemplary system 400 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 400 may include a data collection center 402, a data analysis tool 404, and a user device 406. It should be understood that the system 400 shown in FIG. 4 is an example of one suitable computing system architecture. Each of the components shown in FIG. 4 may be implemented via any type of computing device, such as computing device 300 described with reference to FIG. 3, for example. The components may communicate with each other via a network 408, which may include, without limitation, one or more local area networks (LANs) and/or wide area networks (WANs). Such networking environments are commonplace in offices, enterprise-wide computer networks, intranets, and the Internet. It should be understood that any number of data collection centers, data analysis tools, and user devices may be employed within the system 400 within the scope of the present invention. Each may comprise a single device or multiple devices cooperating in a distributed environment. For instance, the data analysis tool 404 may be provided via multiple devices arranged in a distributed environment that collectively provide the functionality described herein. As another example, multiple data collection centers 402 may exist, for instance, to be located in remote locations, to increase storage capacity, or to correspond with distinct information (e.g., a separate data collection center for separate websites). Additionally, other components not shown may also be included within the network environment.

As described with reference to the data collection center 104 of FIG. 1, in embodiments, the data collection center 402 may collect data from any number of data sources and any type of data sources. In some cases, the data sources generally include any online presence at which website usage occurs or can be detected. In such cases, the data collection center 402 may access data from a web server(s) providing a website(s) and/or from a client device(s) at which a website(s) is being browsed or navigated. As can be understood, the data collection center 402 can contain any amount of numerical data including raw or processed data. The collected data is stored in a storage area, such as a database, for reference by the data analysis tool 404. Any and all such variations of data sources and data associated with the data collection center 402 are contemplated to be within the scope of embodiments of the present invention.

The data analysis tool 404 is configured to detect and/or correct erroneous data, as described in more detail below. Although the data analysis tool 404 is shown as a separate component, as can be understood, the data analysis tool 404, or a portion thereof, can be integrated with another component, such as a data collection center, user device, web server, or the like. For instance, in one embodiment, the data analysis tool 404 is implemented as part of a traffic analysis server or other component specifically designed for web traffic analysis. In another embodiment, the data analysis tool 404 is implemented as part of a web server or other hardware or software component, or it can be implemented as a software module running on a conventional personal computer, for example, that is being used for web traffic analysis.

The data analysis tool 404 can perform error detection and/or data restoration operations in real time (e.g., as data is recorded at the data collection center), in a batch methodology (e.g., upon a lapse of a time duration), or upon demand when a request is made for web traffic data or for detection/correction of erroneous data. By way of example only, in some cases, the data analysis tool 404 automatically initiates detection and restoration of erroneous data, for instance, based on expiration of a time duration, upon recognition of new data, or the like. As another example, a user operating the user device 406 might initiate detection and restoration of erroneous data, either directly or indirectly. For instance, a user may select to "correct erroneous data" to directly initiate the data analysis tool. Alternatively, a user may select to view a data analysis, for example, associated with website usage, thereby triggering the data analysis tool to perform error detection and data restoration. In either case, a user might initiate the functionality request directly to the data collection center 402 or data analysis tool 404, or through a web analytics tool.

As shown in FIG. 4, the data analysis tool 404 includes, among other things not shown, an error detection component 410 and a data restoration component 412. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The error detection component 410 is configured to detect erroneous data. In this way, erroneous data can be detected from within referenced data. Initially, the error detection component 410 operates to reference data, for example, from the data collection center 402. Data can be referenced in any manner including, receiving the data, retrieving the data, or otherwise accessing the data. Further, any amount of data can be referenced. For example, in some cases, all of the data within the data collection center 402 might be referenced. In other cases, a portion of the data within the data collection center 402 might be referenced, such as data associated with a particular entity, service, or website; data collected since a previous data analysis was performed; data collected or corresponding with a particular time frame; or the like. Again, although the data collection center 402 is illustrated as remote from the data analysis tool 404, such stored data can be integrated or directly accessible from the data analysis tool 404 (e.g., via a direct connection).

Figure 5:
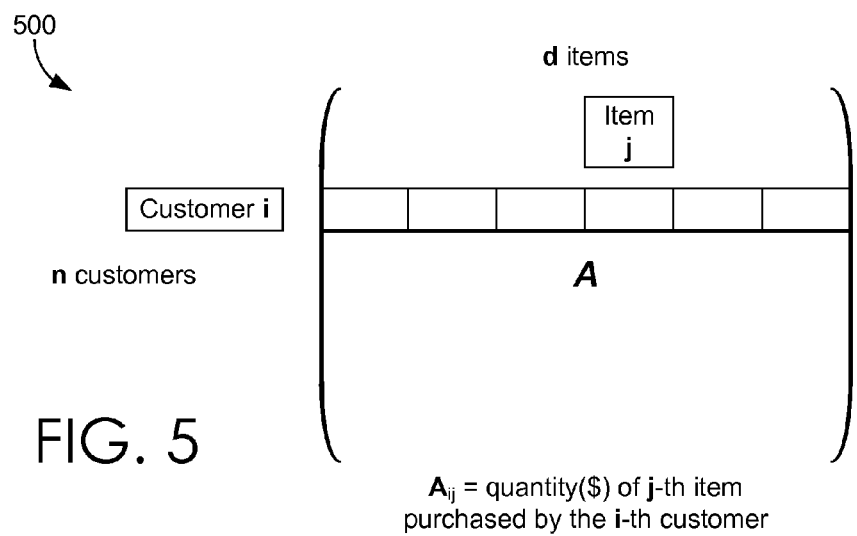
FIG. 5 is an exemplary data matrix having data associated with shopping, in accordance with embodiments of the present invention.
Figure 6:
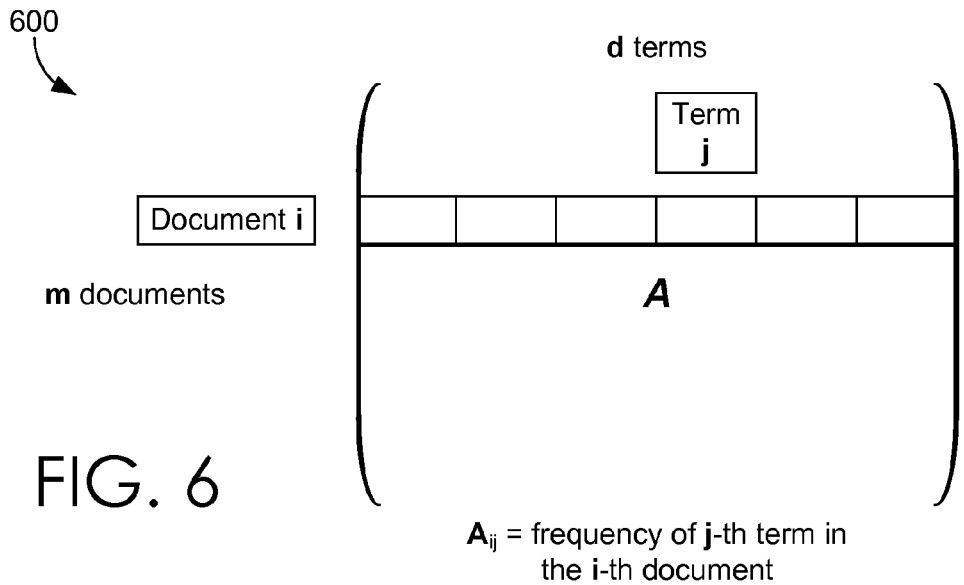
FIG. 6 is an exemplary data matrix having data associated with documents, in accordance with embodiments of the present invention.
Figure 7:
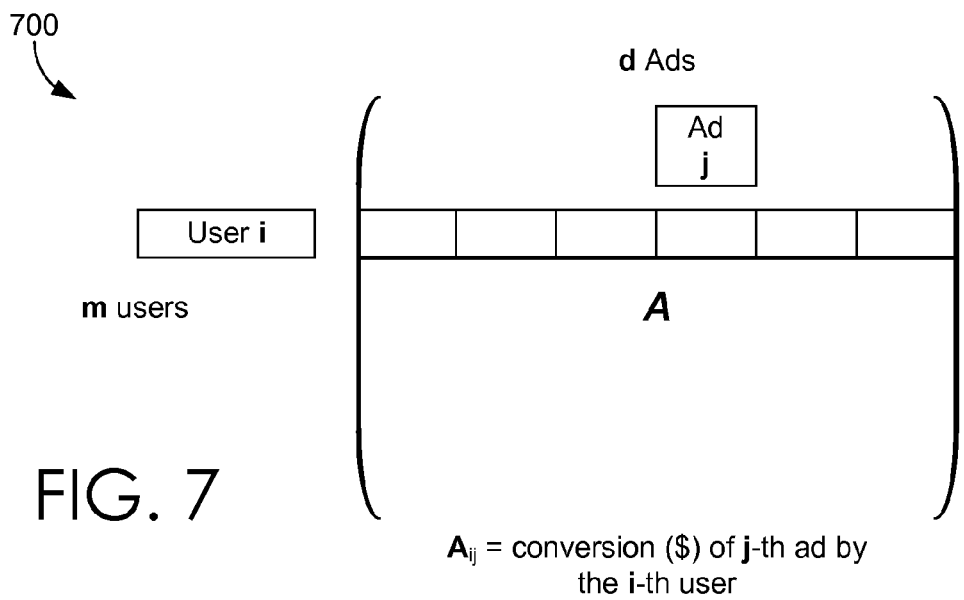
FIG. 7 is an exemplary data matrix having data associated with advertisements, in accordance with embodiments of the present invention.

Generally, the referenced data is represented in the form of one or more matrices. A matrix is defined by a set of rows and a set of columns. The rows can represent users, objects, observations, customers, items, measurements, replications, records, or any other types of data. The columns can represent features, variables, covariates, predictors, attributes, factors, regressors, inputs, fields, or any other types of data. For example, in one embodiment, the rows of a matrix represent various users or customers, and the columns represent various features associated with the users. FIGS. 5-7 illustrate various examples of data matrices. In particular, FIG. 5 is a data matrix 500 pertaining to shopping data. The rows of the data matrix 500 represent customers, and the columns represent various items. As such, a value $A_{ij}$ within the data matrix 500 represents a quantity of the j-th item purchased by the i-th customer. FIG. 6 is a data matrix 600 pertaining to text documents. The rows of the data matrix 600 represent documents, and the columns represent various terms. Accordingly, a value $A_{ij}$ within the data matrix 600 represents a frequency of the j-th term in the i-th document. FIG. 7 is a data matrix 700 pertaining to advertisement targeting. The rows of the data matrix 700 represent users, and the columns represent various advertisements. As such, a value $A_{ij}$ within the data matrix 700 represents a conversion monetary amount associated with the j-th advertisement as initiated by the i-th user.

Irrespective of what the values or data entries within the matrix represent, the error detection component 410 detects or recognizes erroneous data contained therein. In one exemplary embodiment, to detect erroneous data, the error detection component 410 detects the probability of a data entry and/or set of data entries (e.g., a row of data) falling within a distribution. In such an embodiment, a distribution (e.g., normal or Gaussian) of a set of data is initially determined. For an initial data matrix having m rows and n columns (dimensions), the mean and standard deviation of each column can be calculated. As such, a mean and standard deviation is calculated for each feature or variable. As can be appreciated, in some cases, the initial data matrix for which a distribution is determined contains data known to be accurate or correct such that an accurate distribution with which to compare new data is utilized. The mean and standard deviation for each column can be used to identify the distribution of data for the corresponding column. A distribution can be assumed, such as a Gaussian distribution, as well as independence of each feature. Assuming a Gaussian distribution as well as independent and identical distribution of each feature represented by columns, a joint distribution function can be formed, as illustrated by Equation 1 below:

$$P(X)=[P(X^1)P(X^2)\ldots P(X^n)] \quad \text{(Equation 1)}$$

where $P(X^i)$ is the distribution of column i, and has mean $\mu_i$ and standard deviation $\sigma_i$. As such, the referenced data is utilized to identify a joint distribution deemed to fit the data such that each set of data can create a unique model. In this way, a Gaussian distribution based on the data may have a different tail than the standard Gaussian distribution. In cases that the initial data matrix contains data known to be accurate or correct, the determined distribution might be referred to as a correct distribution in association with the data set.

Once the joint distribution function of the initial matrix has been determined, the probability of a new data row $d^{new}$ having been selected from the same distribution can be determined. Since it is assumed that the features are independent, that probability, $Prob(d^{new})$, is the product of the probabilities that the features were selected from the corresponding feature distributions, as shown in Equation 2 below:

$$Prob(d^{new})=Prob(X^1(d^{new}))*Prob(X^2(d^{new}))*\ldots*Prob(X^n(d^{new})) \quad \text{(Equation 2)}$$

where $Prob(X^i(d^{new}))$, given by Equation 3 below, expresses the probability that a given feature value was selected from the corresponding feature distribution:

$$Prob(X^i(d^{new})) = \frac{1}{\sqrt{2\pi}*\sigma_i}\exp\left(\frac{(x^i(d^{new})-\mu_i)^2}{2*\sigma_i^2}\right) \quad \text{(Equation 3)}$$

In embodiments, to determine erroneous data, the probability of the new data row falling with a distribution can be compared to an error detection threshold. In this regard, an error detection threshold can be used to determine whether data is erroneous. In some cases, an error detection threshold can be a probability representing a confidence level that if less than or, in other embodiments, if greater than, indicates erroneous data. As can be appreciated, an error detection threshold can be any value that represents an indication of erroneous data.

In one exemplary embodiment, if the probability associated with the new data meets an error detection threshold, the data can be determined to be erroneous data. For instance, assume that a 95% confidence level of recognizing whether data corresponds with a determined distribution is desired. In this regard, if a 5% probability (or higher) is calculated that the data fits the distribution, the data can be identified as correct. Conversely, if a probability less than 5% is calculated that the data fits the distribution, the data can be identified as erroneous. In a similar manner, if a probability greater than 5% is calculated that the data does not fit the distribution, the data can be identified as erroneous, or if a probability less than 5% is calculated that the data does not fit the distribution, the data can be identified as correct. As previously described, any error detection threshold could be used. For instance, a 99% confidence level might be used to determine erroneous data.

When the probability of the new row of data falling within the joint distribution indicates erroneous data, erroneous data associated with the new data row is recognized. In such cases, the data entries in the new row can be examined for erroneous entries. Examining specific data entries in rows determined to have erroneous data can be performed in any manner. For example, an error detection threshold can similarly be used to detect erroneous data entries. In this way, for a new row of data, if a probability of the data entry falling with the distribution is less than, for instance, 5%, then such an entry is considered erroneous. Further, in some cases, erroneous individual data entries can be detected prior to analyzing new rows of data for erroneous data, concurrent with analyzing new rows of data for erroneous data, or without analyzing new rows of data for erroneous data.

Upon identifying erroneous data entries, the error detection component 410 can omit, discard, or zero any data entries detected to be erroneous. In this regard, any data entries identified as erroneous can be modified to a zero value, or otherwise discarded or indicated as erroneous data (e.g., marked as NA).

Turning now to the data restoration component 412, the data restoration component 412 is configured to restore or correct erroneous data. Stated differently, the data restoration component 412 modifies or replaces erroneous data entries with correct values. To restore or correct erroneous data, the data restoration component 412 can initially identify which data entry(s) has been designated or otherwise determined to be erroneous. As can be appreciated, in some cases, such erroneous data entries might be indicated by use of a zero value, a missing value (e.g., marked as NA), or the like.

The data restoration component 412 can replace erroneous data with a correct value. A correct value or correct data entry refers to a value that is implied as, or determined to be, a correct or accurate value. As such, a correct value is used to replace a value detected to be erroneous. Generally, to determine a correct value, the data restoration component 412 can reduce the number of dimensions of analyzed such that the most meaningful features (dimensions) contributing to a predetermined variation threshold are used to determine a replacement value. Once dimensions associated with the most variation are selected, the values corresponding with the non-selected dimensions are discarded (e.g., modified to a zero value). Thereafter, the data associated with the selected dimensions are used to determine a new value or replacement value for the erroneous data. As such, a replacement value for an original data point deemed erroneous can be identified using fewer dimensions. In this regard, a highly variable set of data points within a large dimensional space can be reduced to a lower dimensional space that exposes the substructure of the original data more clearly. The new value or replacement value can be compared to a previous value associated with the erroneous data entry. This process may be repeated through any number of iterations. When the new replacement value in an iteration is approximately the same as, or converges with, the previous value, the new replacement value is deemed or designated as a correct value.

In embodiments, the data restoration component 412 utilizes singular value decomposition (SVD) to generate a correct value for the erroneous data value. As large data sets have a large number of dimensions (columns), singular value decomposition can be utilized to identify a smaller dimension of space with which to correct erroneous data. For example, assume that data is originally in one million dimensions in space. In such a case, it is difficult to analyze such significant dimensions in space. Singular value decomposition can be used to analyze data associated with a much smaller dimension of space thereby analyzing significantly fewer variables. Such a method has several benefits including removing noise data that have little to no value, improving data accuracy, and increasing efficiency of data analysis.

To perform singular value decomposition, the data restoration component 412 initially references a matrix of data. The matrix can contain any amount of information including indications of erroneous data (e.g., missing value, zero value, etc.). Upon identifying an erroneous data value(s), an initial replacement value(s) may be substituted or entered into the matrix as a new value for the erroneous data entry. The initial replacement value could be any value that represents a starting point for identifying a correct value or data entry. In some cases, the initial replacement value might be a mean, median, or mode value, for example, of a column or dimension. As described more fully below, singular value decomposition is used to determine a value that could be implied as correct for a data entry indicated as erroneous based on other meaningful data in the matrix.

Upon replacing erroneous data with an initial replacement value, the singular value decomposition (SVD) of the matrix is computed. The singular value decomposition of an m×n matrix M is a factorization of the form shown in Equation 4 below:

$$X = UDV^t \quad \text{(Equation 4)}$$

where U is a m×m unitary matrix, D is an m×n rectangular diagonal matrix with nonnegative real numbers on the diagonal, and $V^t$ (the conjugate transpose of V or the transpose of V) is a n×n unitary matrix. The diagonal entries of D are known as the singular values of matrix M. The diagonal matrix D is a matrix where all the entries are 0 when i (indication of column) does not equal j (indication of row). In other words, the only nonzero values are positioned along the main dialog from the upper left corner to the lower right corner of the diagonal matrix D, as shown below.

$$D = \begin{bmatrix} d_1 & o & o & & o \\ o & d_2 & o & & o \\ o & o & d_3 & & o \\ o & o & o & \ddots & o \\ o & o & o & & d_n \end{bmatrix}$$

In embodiments, the singular values indicate a variation associated with the corresponding singular vectors (u) or columns of U. The singular values are listed in descending order beginning with the largest singular value occupying the upper left corner. To this end, dimensions along which data points exhibit the most variation are ordered from most variation to least along the diagonal (i.e., $d_1 \geq d_2 \geq \ldots \geq d_n \geq 0$). The columns of U and V are left- and right-singular vectors, respectively, for the corresponding singular values.

Upon computing the singular value decomposition (SVD) of a matrix, a number of dimensions k to which to reduce the data is determined or identified. The number of dimensions k to which to reduce the data can be any number and can vary from one matrix analysis to another. With singular value decomposition, data associated with variation below a threshold can be removed or become a zero value to reduce the amount of data analyzed, but data is maintained that might be essential to identifying a correct value to replace an erroneous data entry.

In embodiments, determining an appropriate number of dimensions k is based on the variation of data meeting a variation threshold. As used herein, a variation threshold refers to any value that indicates an extent of variation. For instance, a variation threshold might be a probability (e.g., percent) that, if exceeded, indicates that a certain amount of variation exists in data associated with the corresponding number of dimensions k. By way of example only, a number of dimensions k is sufficient to explain 95% of the variation of data in a new space (e.g., reduced number of dimensions). With the reduced number of dimensions, although the original set of data would not exist, 95% of the variation explained in the smaller dimension of space would exist.

To determine an appropriate number of dimensions k, the diagonal matrix of the singular value decomposition is utilized. Utilizing a diagonal matrix with each singular value indicating an amount of variation of the original data explained in the new space, an appropriate number of dimensions k that exceed a predetermined variation threshold can be identified. For instance, Equation 5 below provides one exemplary method for determining an appropriate number of dimensions k. Using Equation 5 below, variation explained in the new space in association with any number of singular values k can be calculated.

$$\frac{\sum_{i=1}^{k} d_i}{\sum_{i=1}^{n} d_i} = \text{variation explained in the new } k \text{ dimensional space} \quad \text{(Equation 5)}$$

In operation, a variation associated with a first dimension of k equal to 1 can be calculated. For example, the value of $d_1$ (as illustrated in the above diagonal matrix) over the sum of $d_1$ to $d_n$ equals the variation explained in a new dimensional space of k dimension. If the variation exceeds a variation threshold, such as 95%, a k equal to 1 can be deemed appropriate. If the variation does not exceed the variation threshold, a variation associated with a second dimension of k equal to 2 can be calculated. For example, the sum of $d_1$ and $d_2$ (as illustrated in the above diagonal matrix) over the sum of $d_1$ to $d_n$ equals the variation explained in a new two dimensional space ($d_1$ and $d_2$). This process can be repeated until a variation is explained in a new space that exceeds the variation threshold. As can be appreciated, the predetermined variation threshold can be maintained or remain consistent through each iteration.

Upon determining the appropriate number of dimensions k based on variation of the data, the remaining entries of the diagonal matrix can be discarded or replaced with zeros. In this regard, each of the singular values associated with the non-selected dimensions in the diagonal matrix is modified to a zero value. By way of example only, assume that $d_1$, $d_2$, and $d_3$ within a diagonal having n singular values are identified as being associated with a variation that exceeds a variation threshold. In such a case, three dimensions of space including $d_1$, $d_2$, and $d_3$ are selected and retained for reducing the dimensions of data. The singular vectors corresponding with the selected singular values are also maintained, while the remaining singular vectors are modified to a zero value. In this way, corresponding row vectors of U and corresponding column vectors of V are discarded or modified to a zero value to give an approximation of a correct value using the reduced dimensions as opposed to the full dimensions. By discarding or zeroing elements representing dimensions which do not exhibit meaningful variation, noise is effectively eliminated.

In accordance with a smaller dimension of space, a low rank data matrix M(k) for the number of dimensions k (number of new dimensions and the rank of matrix M(k)) can be computed to identify a replacement or new value, for example, using constraint reconstruction error. Computing a rank data matrix enables generation of a matrix having a replacement value or a new value for the data entry determined to be erroneous. Because a smaller dimension of space is used to calculate the rank data matrix, noise is generally removed such that the replacement value is more accurate. To compute the rank data matrix for the number of dimensions k, the three matrices resulting from SVD and, thereafter, modified based on the selected number of dimensions (e.g., having data entries discarded or modified to a zero value) can be used to obtain the original dimension with the replacement values.

In embodiments, the new or replacement value is analyzed to determine if the replacement value should be deemed a correct value for the erroneous data entry. To do so, a replacement value is compared with a previous data entry. Initially, the previous data entry might be the initial replacement value, such as a mean, median, or mode of the column, described above. However, as multiple iterations of determining a new replacement value may be performed, the previous data entry might be a replacement value identified in a previous iteration. When it is determined that the previous data value and the new replacement value are within a convergence threshold value of one another, the new replacement value can be deemed correct. A convergence threshold value can be any value indicating convergence of data (e.g., 0.00001). When it is determined that the previous data value and the new replacement value are not within a convergence threshold value of one another, singular value decomposition performed on the matrix including the new replacement value (i.e., a replacement matrix or a modified matrix), reduction of dimensions, and rank matrix computation can be repeated to obtain another new replacement value. This process can continue until a new replacement value as compared to a previous value are within a convergence threshold value of one another. In other words, the method used to compute new data entry values continues until a previous value and a new replacement value converge with one another indicating a correct value to replace data identified as erroneous. Equation 6 below provides one method for determining when the new replacement value and the previous value converge thereby indicating a correct value has been identified:

$$\frac{\|x^{new} - x^{prev}\|}{x^{prev}} \leq \delta \quad \text{(Equation 6)}$$

While various iterations may be used to obtain a correct value for replacing an erroneous value, it is important to note that the number of dimensions k with which to reduce data can vary for each iteration. That is, a new k representing a number of dimensions might be different for each iteration performed in obtaining a correct value. For example, in a first iteration, k could equal three dimensions of space, and in a second iteration, k could equal five dimensions space. As can be appreciated, the variation threshold, such as 95%, to be achieved in the new space can remain consistent through each iteration. Accordingly, the change in the number of dimensions used in each iteration may be based on the utilization of the new replacement value in the matrix of data and its effect on variation of the corresponding dimension.

Although data correction is generally described above with respect to replacing a single value in a matrix, any number of values can be corrected simultaneously or subsequently to one another. Any and all such variations to restoring data are intended to be included in the scope of embodiments of the present invention.

As can be appreciated, upon identifying a correct value for an erroneous data entry, the correct value can replace such erroneous data in the data matrix. As such, a modified or replacement matrix (i.e., a corrected matrix) exists having implied correct values. The corrected matrix can be used for more accurate analysis of the data. In this regard, an analytics tool, such as a web analytics tool, can access the corrected matrix and perform analysis on the data. Although not shown, an analytics tool might be incorporated with the data analysis tool or remote from the data analysis tool (e.g., accessible over the network 308, accessible by a direct connection, integrated with a user device 306, integrated with the data collection center 302, or the like).

The corrected data matrix, or analysis performed using the corrected data matrix, can be provided to the user device 306, e.g., via a web analytics tool. As such, a user of the user device can view the corrected data or analytic results based on the corrected data. In either case, the user is provided with more accurate information as the erroneous data is replaced with implied correct values.

Figure 8:
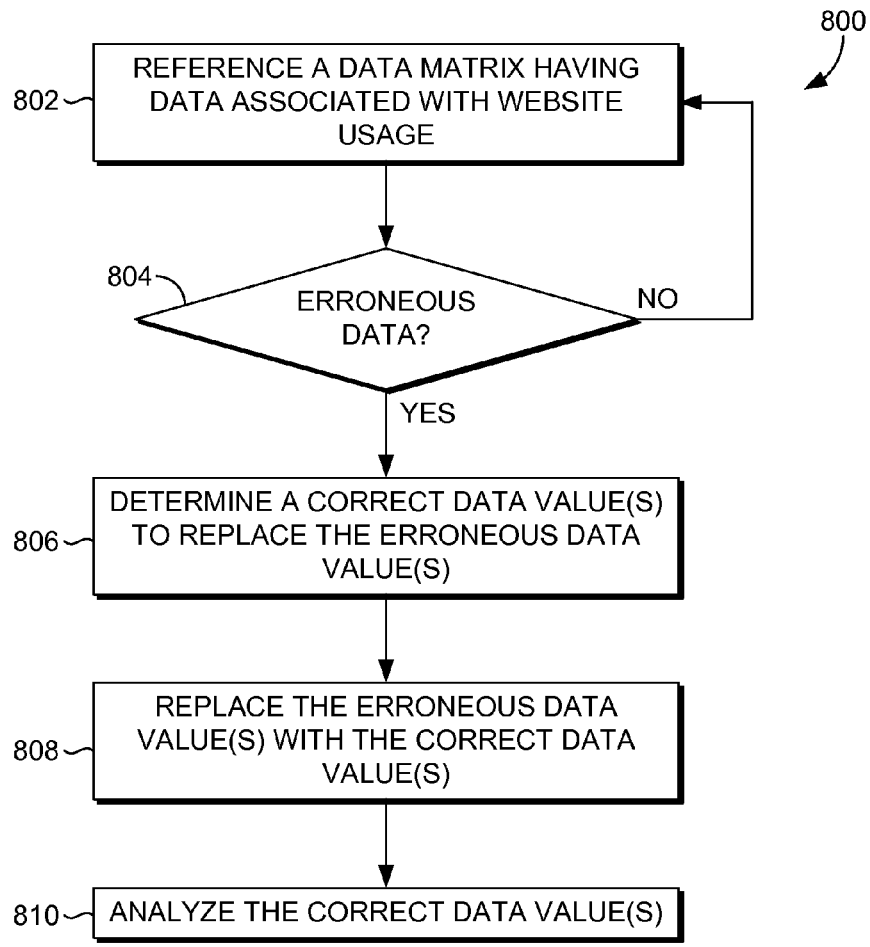
FIG. 8 is a flow diagram showing a method for detecting and correcting erroneous data in a web analytics environment in accordance with an embodiment of the present invention.

Turning now to FIG. 8, a flow diagram is provided that illustrates a method 800 for detecting and correcting erroneous data in a web analytics environment. Initially, as shown at block 802, a data matrix of data associated with website usage is referenced. At block 804, it is determined if any data within the data matrix is erroneous. If it is determined that data is not erroneous, the method can return to block 802, for example, when new data is added to the data matrix. On the other hand, if it is determined that at least one data value is erroneous, the data within the matrix are analyzed to determine a correct data value(s) to replace the erroneous data value(s). This is shown at block 806. Subsequently, at block 808, the correct data value(s) replaces the erroneous data value(s) within the matrix. The modified matrix including the correct data value(s) can then be analyzed to provide valuable information regarding website usage, as indicated at block 810. Such analysis can be provided to a user device for display to a user.

Figure 9:
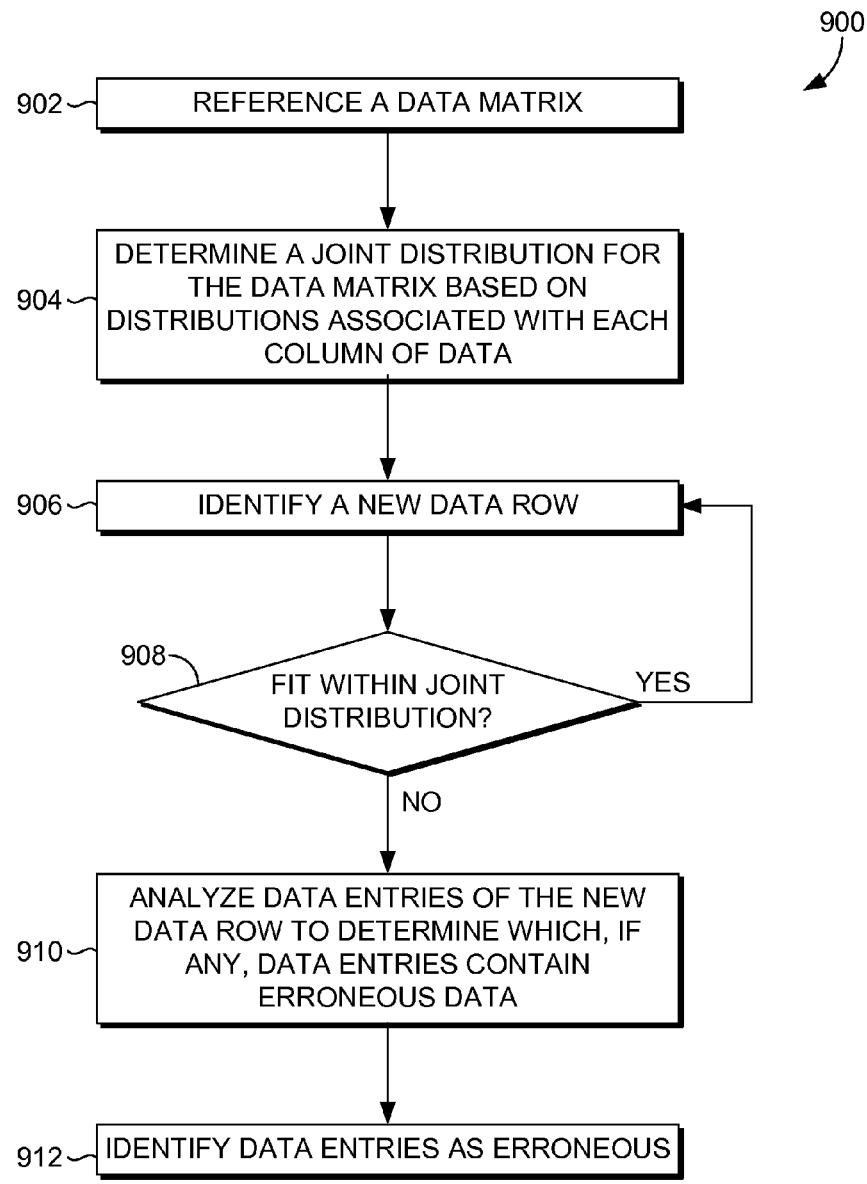
FIG. 9 is a flow diagram showing a method for detecting erroneous data in accordance with an embodiment of the present invention.

Turning now to FIG. 9, a flow diagram is provided that illustrates a method 900 for detecting erroneous data, in accordance with embodiments provided herein. Such a method may be employed, for example, by an error detection component, such as error detection component 410 of FIG. 4. Initially, at block 902, a data matrix is referenced. In embodiments, the data matrix is known to have correct, accurate, or reliable data (i.e., non-erroneous data). At block 904, a joint distribution for the data matrix is determined based on distributions associated with each column of data, for example, using the mean and standard deviation associated with each column. In some implementations, the joint distribution is formed based on an assumption of a Gaussian distribution as well as independence of each feature. At block 906, a new data row is identified. For example, a new data row might be a new row of data added to the matrix referenced at block 902. Subsequently, at block 908, it is determined whether the new data row fits within the joint distribution determined for the data matrix. Such a determination can be made based on the probability of the new data row having been selected from the determined joint distribution. When the probability meets an error detection threshold, the new data row can be identified as including erroneous data.

If it is determined that the new data row fits within the joint distribution determined for the data matrix, the new data row is recognized as not having erroneous data, and the method can return to block 906 to detect errors in any additionally collected data. Alternatively, the method could return to block 902 for use in determining a new joint distribution of data including the new non-erroneous data row. On the other hand, if it is determined that the new data row does not fit within the joint distribution determined for the data matrix, at block 910, the data entries of the new data row are analyzed to determine which, if any, data entries contain data deemed to be erroneous. Subsequently, at block 912, data entries identified as erroneous are indicated as such. For example, to indicate a data entry as erroneous, the data value might be removed, replaced with a zero value, or the like.

Figure 10:
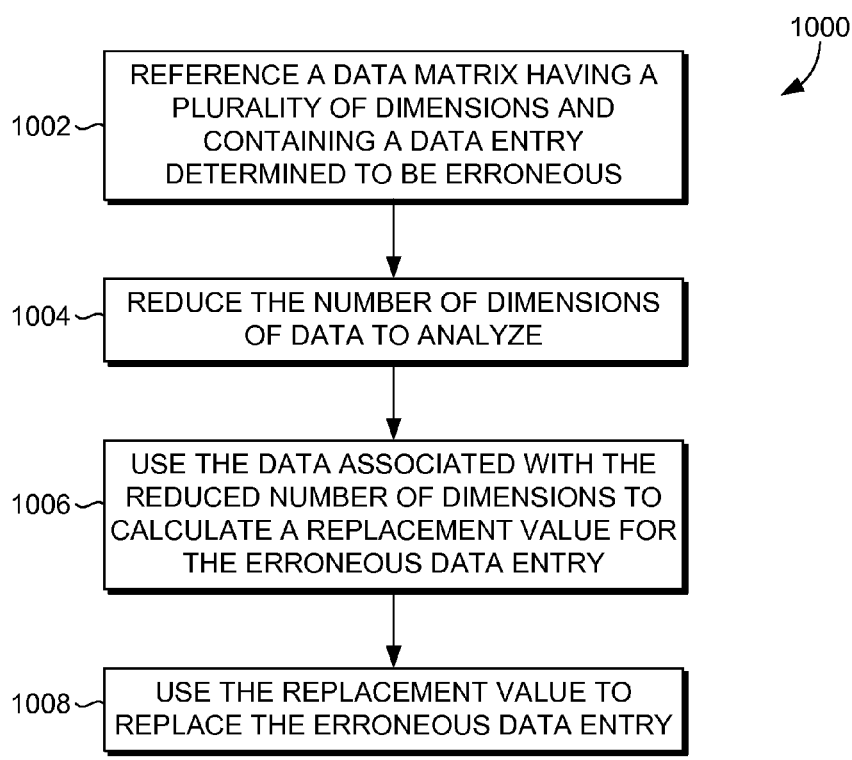
FIG. 10 is a flow diagram showing a first method for correcting erroneous data in accordance with an embodiment of the present invention.

With reference now to FIG. 10, a flow diagram is provided that illustrates a method 1000 for restoring data values determined to be erroneous, in accordance with embodiments described herein. Such a method may be employed, for example, by a data restoration component, such as data restoration component 412 of FIG. 4. Initially, as indicated at block 1002, a data matrix having a plurality of dimensions and containing a data entry determined to be erroneous is referenced. At block 1004, the number of dimensions of data to analyze is reduced thereby minimizing noise but maintaining dimensions contributing to variations in data. In some embodiments, to reduce the number of dimensions, singular value decomposition is applied and, thereafter, singular values of the diagonal matrix are selected that explain a variation threshold of the new space (e.g., 95%). The singular values associated with the non-selected dimensions are replaced with zeros. At block 1006, the data associated with the reduced number of dimensions are used to calculate a replacement value for the erroneous data entry. The replacement value is used to replace the erroneous data entry, as indicated at block 1008.

Figure 11:
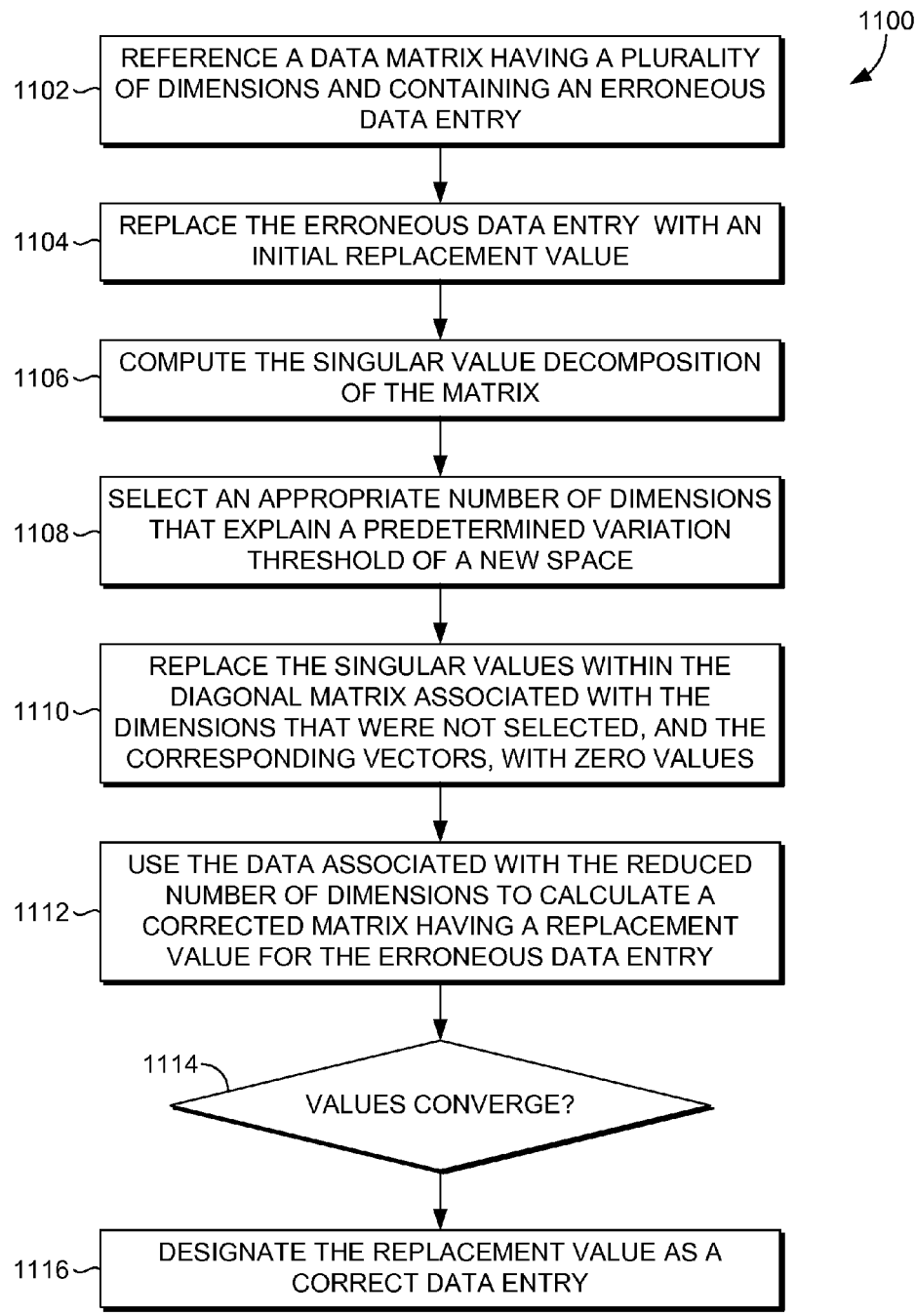
FIG. 11 is a flow diagram showing a second method for correcting erroneous data in accordance with an embodiment of the present invention.

Turning now to FIG. 11, a flow diagram is provided that illustrates another method 1100 for restoring data values determined to be erroneous, in accordance with embodiments described herein. Such a method may be employed, for example, by a data restoration component, such as data restoration component 412 of FIG. 4. Initially, as indicated at block 1102, a data matrix having a plurality of dimensions and containing a data entry determined to be erroneous is referenced. At block 1104, the erroneous data entry is replaced with an initial replacement value. As previously described, the initial replacement value can be any value, such as a mean, median, or mode value of the column in which the erroneous data entry is located. With the erroneous data entry in the matrix being replaced with an initial replacement value, the singular value decomposition of the matrix is computed, as indicated at block 1106. In accordance with singular values in descending order in the diagonal matrix, an appropriate number of dimensions that explain a predetermined variation threshold of a new space is selected. This is shown at block 1108. In some embodiments, an appropriate number of dimensions k is selected when the sum of singular values being analyzed k divided by the sum of all of the singular values in the diagonal matrix is greater than a predetermined variation threshold, such as 95%. At block 1110, the singular values within the diagonal matrix associated with the dimensions that were not selected, and the corresponding vectors, are replaced with zero values to reduce the number of dimensions. At block 1112, the data associated with the reduced number of dimensions are used to calculate a corrected matrix having a replacement value for the erroneous data entry. Subsequently, at block 1114, it is determined if the replacement value for the erroneous data entry converges with the previous replacement value. As can be appreciated, in some instances, the previous replacement value might be the initial replacement value that is an initial replacement of an erroneous data entry. In other instances, the previous replacement value might be a replacement value calculated in a previous iteration. As previously described, a convergence threshold might be used to determine whether the data converges. If it is determined that the replacement value does not converge with the previous replacement value, the method returns to block 1106 at which the singular value decomposition of the corrected matrix is calculated. Any number of iterations can be performed until a determination is made that a replacement value converges with the previous replacement value. Returning to block 1114, if it is determined that the replacement value converges with the previous replacement value, at block 1116, the replacement value is designated as a correct data entry for replacing the erroneous data entry. While the method 1100 discussed correcting a single erroneous data value, it should be understood that multiple erroneous data values may be similarly restored.

As can be understood, embodiments of the present invention provide for, among other things, detection and/or restoration of erroneous data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transient computer storage media storing computer-useable instructions that, when used by one or more computing devices, cause the one or more computing devices to perform operations comprising:
   referencing a matrix having a data entry detected as erroneous;
   selecting a number of dimensions to which to reduce, wherein the number of dimensions is selected based on data variation, associated with the number of dimensions, that exceeds a variation threshold;
   reducing data in accordance with the selected number of dimensions; and
   using a set of remaining data corresponding with a reduced number of dimensions to generate a replacement value for the data entry detected as erroneous.

2. The one or more computer storage media of claim 1, wherein the matrix contains data related to web traffic.

3. The one or more computer storage media of claim 1, wherein singular value decomposition is used to select the number of dimensions to which to reduce.

4. The one or more computer storage media of claim 3, wherein a diagonal matrix of the singular value decomposition is used to select the number of dimensions based on data variation associated with the number of dimensions that exceeds the variation threshold.

5. The one or more computer storage media of claim 1, wherein the number of dimensions is reduced by replacing singular values and corresponding vectors corresponding to non-selected dimensions with zero.

6. The one or more computer storage media of claim 1, wherein using data corresponding with the reduced number of dimensions to generate the replacement value for the data entry detected as erroneous comprises computing a rank data matrix.

7. The one or more computer storage media of claim 1 further comprising determining that the replacement value is an implied correct value for the data entry detected as erroneous.

8. The one or more computer storage media of claim 7, wherein the replacement value is determined to be the implied correct value for the date entry based on an indication of convergence between the replacement value and an initial replacement value selected to replace the erroneous data entry.

9. The one or more computer storage media of claim 7, wherein the replacement value is determined to be an implied correct value for the date entry based on an indication of convergence between the replacement value and a previous replacement value selected for the erroneous data entry.

10. The one or more computer storage media of claim 1 further comprising replacing the erroneous data with the replacement value.

11. The one or more computer storage media of claim 10 further comprising using the matrix with the replacement value to determine another replacement value to replace the erroneous data.

12. A computer-implemented method for detecting and restoring erroneous data, comprising:
   computing, by one or more processors, a singular value decomposition of a data matrix having a data entry determined to be erroneous, the singular value decomposition including a diagonal matrix associated with a first number of dimensions;
   determining, by the one or more processors, that the first number of dimensions is to be reduced to a second number of dimensions when a sum of singular values within the diagonal matrix that correspond to the second number of dimensions divided by a sum of singular values within the diagonal matrix that correspond to the first number of dimensions exceeds a variation threshold;
   reducing, by the one or more processors, matrices of the singular value decomposition in accordance with the second number of dimensions; and
   using, by the one or more processors, the reduced matrices of the singular value decomposition to calculate a replacement value for the erroneous data entry.

13. The method of claim 12, wherein the variation threshold comprises a probability that, when exceeded, indicates the second number of dimensions for a new dimension of space.

14. The method of claim 12, wherein reducing matrices of the singular value decomposition in accordance with the second number of dimensions comprises replacing singular values within the diagonal matrix and corresponding singular vectors that do not correspond with the second number of dimensions with a zero value.

15. The method of claim 12 further comprising replacing the erroneous data entry with the replacement value.

16. The method of claim 12 further comprising determining that the replacement value is a correct value for the erroneous data entry by identifying a convergence of the replacement value with a previous replacement value.

17. The method of claim 12 further comprising determining that the replacement value is a correct value for the erroneous data entry by identifying a convergence of the replacement value with an initial replacement value comprising a mean, median, or mode of a column corresponding with the erroneous data entry.

18. A system, comprising:
  one or more processors; and
  one or more non-transient computer storage media storing computer-useable instructions that, when used by the one or more processors, cause the one or more processors to:
    detect an erroneous data entry within a matrix;
    replace the erroneous data entry within the matrix with an initial replacement value;
    perform singular value decomposition on the matrix with the initial replacement value, the singular value decomposition including a diagonal matrix having singular values that provide an indication of variance of the corresponding dimension;
    maintain one or more largest singular values within the diagonal matrix when the sum of the one or more largest singular values divided by a sum of all the singular values within the diagonal matrix exceeds a variance threshold value;
    utilize the one or more largest singular values to determine a replacement value for the erroneous data entry; and
    compare the replacement value with the initial replacement value to determine that the replacement value is a correct implied value for the erroneous data entry.

19. The system of claim 18, wherein the matrix contains data associated with website traffic.

20. The system of claim 18, wherein the one or more largest singular values are used to compute a rank data matrix to determine the replacement value for the erroneous data entry.

* * * * *

UNITED STATES PATENT AND TRADEMARK OFFICE
CERTIFICATE OF CORRECTION

PATENT NO.       : 9,298,540 B2
APPLICATION NO.  : 14/190877
DATED            : March 29, 2016
INVENTOR(S)      : Kourosh Modarresi It is certified that error appears in the above-identified patent and that said Letters Patent is hereby corrected as shown below:

In the Claims

Col. 18, Line 24: Replace the word "date" with the word "data"

Col. 18, Line 30: Replace the word "date" with the word "data"

Signed and Sealed this
Fourteenth Day of June, 2016

Michelle K. Lee
*Director of the United States Patent and Trademark Office*